US011428927B2

(12) United States Patent
Nakamura

(10) Patent No.: US 11,428,927 B2
(45) Date of Patent: Aug. 30, 2022

(54) OPTICAL SYSTEM, AND ACCESSORY APPARATUS AND IMAGING APPARATUS INCLUDING THE SAME

(71) Applicant: CANON KABUSHIKI KAISHA, Tokyo (JP)

(72) Inventor: Tsubasa Nakamura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 487 days.

(21) Appl. No.: 16/665,695

(22) Filed: Oct. 28, 2019

(65) Prior Publication Data

US 2020/0132987 A1    Apr. 30, 2020

(30) Foreign Application Priority Data

Oct. 30, 2018    (JP) .............................. JP2018-204486

(51) Int. Cl.
*G02B 27/00*    (2006.01)
*G03B 17/14*    (2021.01)
*G03B 11/00*    (2021.01)

(52) U.S. Cl.
CPC .......... *G02B 27/0018* (2013.01); *G03B 11/00* (2013.01); *G03B 17/14* (2013.01)

(58) Field of Classification Search
CPC .... G02B 27/0018; G03B 11/00; G03B 17/14; G03B 17/12
See application file for complete search history.

(56) References Cited

U.S. PATENT DOCUMENTS

2015/0234150 A1*    8/2015    Katsunuma .......... H04N 5/2254
348/360

\* cited by examiner

*Primary Examiner* — Robert E. Tallman
(74) *Attorney, Agent, or Firm* — Canon U.S.A., Inc. IP Division

(57) ABSTRACT

An optical system is arranged on an object side relative to a first optical portion, the first optical portion including a plurality of lens portions each configured to form an image of an object, and a plurality of filters corresponding to the plurality of lens portions, and the optical system includes a second optical portion including an optical surface common to the plurality of lens portions, wherein the following conditional expression is satisfied:

$$\frac{1}{2} \times \arctan\left\{\frac{2 \times \tan\omega 1 - \frac{\Delta h1}{D1}}{1 - \tan\omega 1 \times \left(\tan\omega 1 - \frac{\Delta h1}{D1}\right)}\right\} < \theta 1.$$

20 Claims, 10 Drawing Sheets

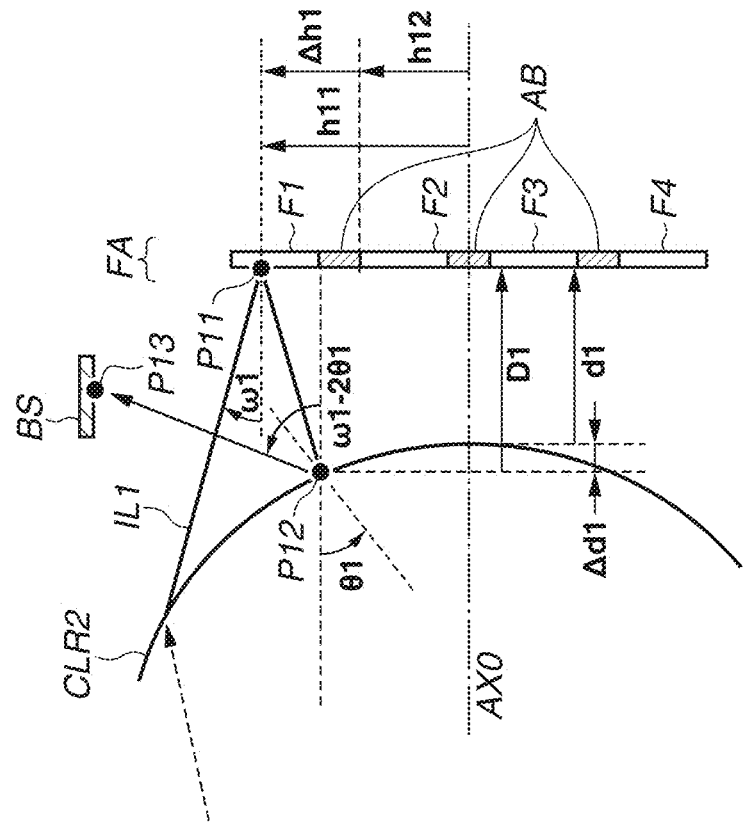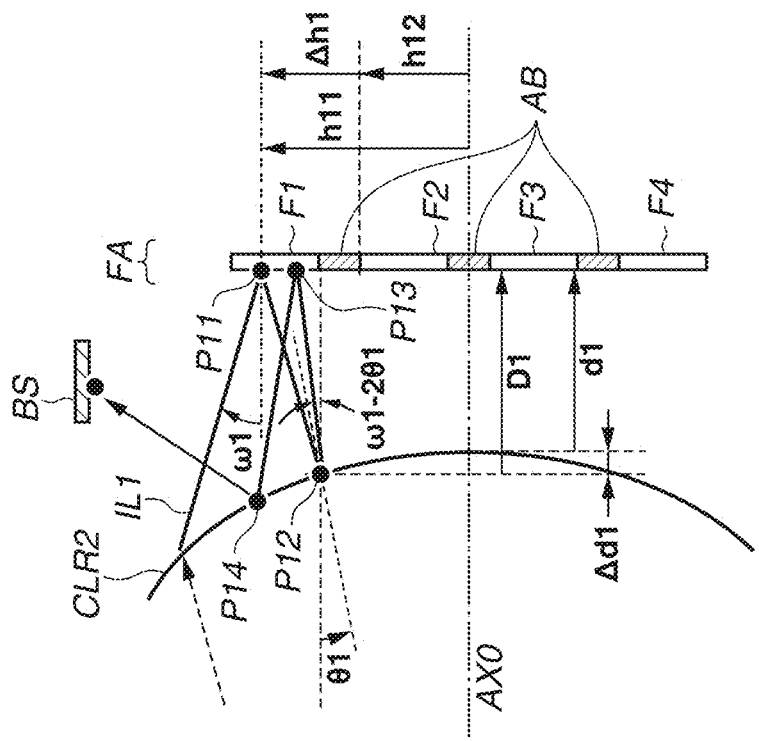

OPTICAL SYSTEM, AND ACCESSORY APPARATUS AND IMAGING APPARATUS INCLUDING THE SAME

BACKGROUND

Field of the Disclosure

The present disclosure relates to an optical system including a plurality of lens portions each configured to form an image of an object, and is suitably used for, for example, an imaging apparatus such as a digital still camera and a video camera.

Description of the Related Art

As an optical system to be used for an imaging apparatus, an optical system that forms a plurality of images of an object (subject) by a plurality of lenses is known. In such an optical system, a plurality of filters having different transmission characteristics is provided on the optical axes of the plurality of lenses, thereby making it possible to simultaneously capture a plurality of different pieces of image information in one image capturing operation.

United States Patent Application Publication No. 2015/0234150 discusses an optical system including a light-shielding plate that is arranged on an image side with respect to a filter and shields light incident on an area other than an effective area of each lens.

However, the light-shielding plate discussed in United States Patent Application Publication No. 2015/0234150 cannot shield stray light that is reflected by some of the filters and is further reflected on an optical surface arranged at a side closer to an object than each filter is. When the stray light enters an image sensor through other filters, a ghost occurs in obtained image information.

SUMMARY

The present disclosure is directed to providing an optical system capable of suppressing the occurrence of a ghost due to stray light reflected by a plurality of filters, and an accessory apparatus and an imaging apparatus which include the optical system.

An optical system is arranged on an object side relative to a first optical portion, the first optical portion including a plurality of lens portions each configured to form an image of an object, and a plurality of filters corresponding to the plurality of lens portions, and the optical system includes a second optical portion including an optical surface common to the plurality of lens portions, wherein the following conditional expression is satisfied:

$$\frac{1}{2} \times \arctan\left\{ \frac{2 \times \tan\omega 1 - \frac{\Delta h1}{D1}}{1 - \tan\omega 1 \times \left(\tan\omega 1 - \frac{\Delta h1}{D1}\right)} \right\} < \theta 1,$$

where $\omega 1$ [deg] is an angle formed between an optical axis of the second optical portion and a light beam from the object, the light beam being incident from an opposite side of the optical axis of the second optical portion on a first point in a first filter among the plurality of filters; $\theta 1$ [deg] is an angle formed between the optical axis and a normal line to the optical surface at a second point where the light beam reflected at the first point is incident; $D1$ [mm] is a distance in an optical axis direction from the first filter to the second point; $h11$ [mm] is a distance from the first point to the optical axis; $h12$ [mm] is a distance to the optical axis from an edge of a second filter facing the first filter, the second filter being adjacent to a side of the first filter closer to the optical axis; and $\Delta h1 = h11 - h12$ holds.

Further features of the present invention will become apparent from the following description of exemplary embodiments with reference to the attached drawings.

BRIEF DESCRIPTION OF THE DRAWINGS

FIGS. 5A and 5B are second schematic diagrams each illustrating an optical system according to an exemplary embodiment.

DESCRIPTION OF THE EMBODIMENTS

Figure 1A:
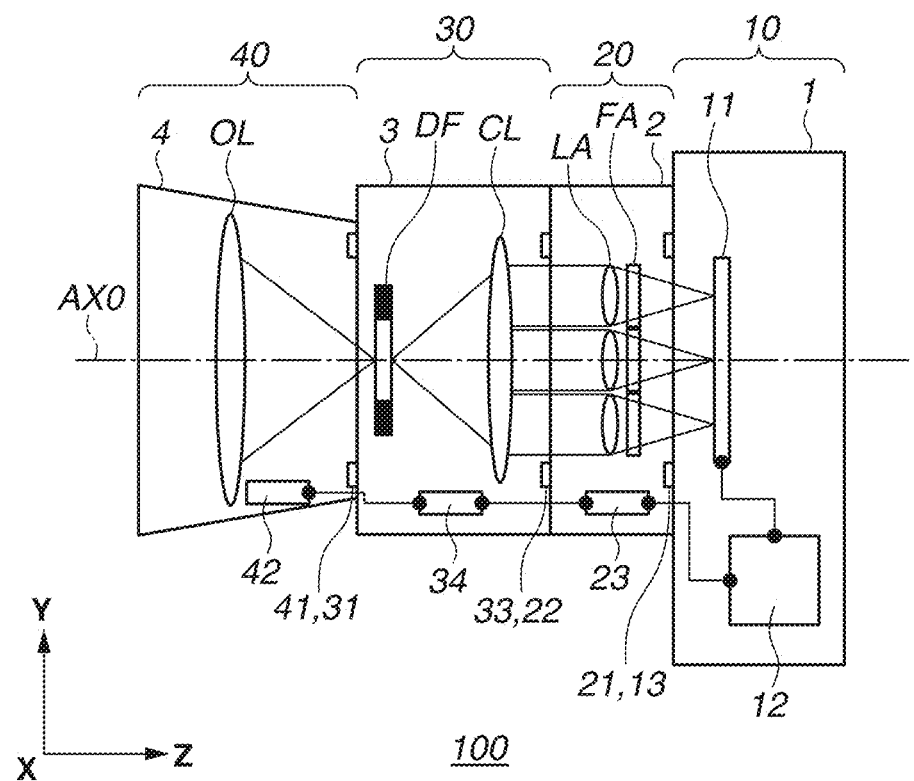
FIGS. 1A and 1B are schematic diagrams each illustrating a major part of an image capturing system according to an exemplary embodiment.

Exemplary embodiments of the present invention will be described with reference to the accompanying drawings. The drawings may be in sizes different from the actual sizes for convenience. Further, in the drawings, the same members are denoted by the same reference numbers, and repeated descriptions thereof are omitted.

Figure 1B:
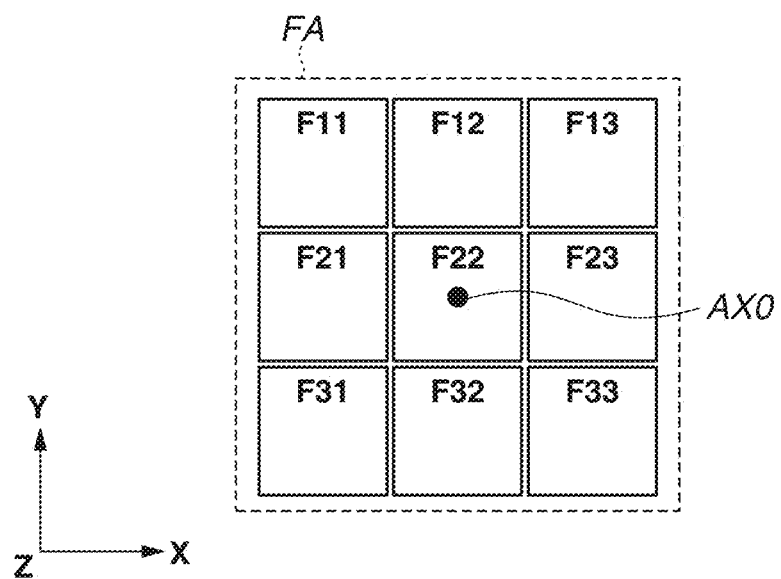

FIGS. 1A and 1B are schematic diagrams each illustrating a major part of an image capturing system 100 according to an exemplary embodiment of the present invention. FIG. 1A illustrates a cross-section (Y-Z plane) including optical axes of some of a plurality of lens portions to be described below. The term "optical axis" used herein refers to an axis that passes through the center (vertex) of each optical surface (each lens surface) in each lens portion. FIG. 1A illustrates a marginal light beam of an axial ray focused on an axial image height of each lens portion. FIG. 1B illustrates a front view of a filter array FA, which is described below, as viewed from an object side (−Z-side). Assume that an object (not illustrated) as an image capturing target is arranged on the object side of the image capturing system 100.

The image capturing system 100 includes an imaging apparatus (camera unit) 10, an optical apparatus (array unit) 20, an adapter apparatus (adapter unit) 30, and a lens apparatus (lens unit) 40, which are arranged in order from the image side (+Z-side).

The imaging apparatus 10 includes an image sensor (light-receiving element) 11 which includes an imaging plane (light-receiving plane) arranged on an image plane of the optical apparatus 20, and a holding member (casing) 1 that holds the image sensor 11. As the image sensor 11, a photoelectric conversion element such as a charge-coupled device (CCD) sensor or a complementary metal-oxide semiconductor (CMOS) sensor can be employed. The image sensor 11 may be configured to photoelectrically convert not only visible light but also infrared light (near-infrared light and far-infrared light) and the like. For example, an image sensor using a material such as Si, InGaAs, or InAsSb, may be employed depending on a use wavelength range. The number of pixels of the image sensor 11 can be determined based on a resolution required in the image capturing system 100.

The optical apparatus 20 includes an optical system and a holding member (lens barrel) 2 that holds the optical system. The optical system according to the present exemplary embodiment includes a lens array LA including a plurality of lens portions each configured to form an image of an object, and the filter array FA including a plurality of filters arranged on the optical axis of each lens portion. As illustrated in FIG. 1B, the plurality of filters in the filter array FA includes a plurality of filters arranged in an X-direction vertical to an optical axis (main optical axis) AX0 of each of the adapter apparatus 30 and the lens apparatus 40 and in a Y-direction.

Each of the plurality of lens portions according to the present exemplary embodiment consists of one or more lenses, and forms an image of an object on the imaging plane of the image sensor 11. In other words, on the image plane of the lens array LA, a plurality of images (image array) of an object is formed by a plurality of lens portions. In other words, the image of the same object can be duplicated by the lens array LA. The plurality of lens portions may be integrally formed so as to facilitate production or arrangement, or may be separately formed so that the position adjustment (focus adjustment or the like) of individual lens portions can be made.

The plurality of filters (optical filters) according to the present exemplary embodiment includes a plurality of filters having different transmission characteristics. The transmission characteristics described herein refer to optical characteristics that vary the state of incident light, including a wavelength range (transmission wavelength range) of light to be transmitted, a direction or a type (polarization state) of polarization to be transmitted, and an intensity (transmittance) of transmitted light with respect to the intensity of incident light. Specifically, the filter array FA may include a plurality of polarization filters of different types and a plurality of filters having different transmittances. The use of the filter array FA consisting of a plurality of filters having different transmission characteristics makes it possible to simultaneously obtain a plurality of pieces of different image information on the same object.

Specifically, a plurality of pieces of image information corresponding to a plurality of wavelength ranges can be simultaneously obtained by using a plurality of filters (band-pass filters) having different central wavelengths in a transmission wavelength range. In this case, the image capturing system 100 can be configured as a multispectral camera capable of obtaining image information corresponding to four or more types of wavelength range which are more than the wavelength ranges (RGB) of general cameras. The image capturing system 100 can be configured as a hyperspectral camera capable of obtaining image information corresponding to 100 or more types of wavelength ranges. Instead of using band-pass filters, wavelength conversion filters that convert the wavelength of incident light and emit the converted light may be used.

Alternatively, the use of a plurality of polarization filters of different types makes it possible to simultaneously obtain a plurality of pieces of image information corresponding to a plurality of polarization states. For example, three linear polarization filters that transmit a linear polarization in directions which are parallel to the X-direction (horizontal direction), the Y-direction (vertical direction), and the directions at an angle of 45° with respect to each of the X-direction and the Y-direction, respectively, and a circularly polarized light filter that transmits circularly polarized light can be used. Thus, the use of a plurality of different types of polarization filters that vary the polarization state of incident light makes it possible to obtain polarization information such as polarization characteristics (stokes parameter) of an object and a two-dimensional distribution of polarization states of an object.

Further, when the filter array FA consists of a plurality of filters having different types of transmission characteristics, various types of information, such as wavelength information, polarization information, brightness information, and parallax information, can be simultaneously obtained. In this case, each of the plurality of filters of different types may be arranged on the optical axes of different lens portions, or instead, the filters may be arranged on the same optical axis. In the latter case, the obtained image information is filtered by an image processing unit (not illustrated), to allow the image information to be separated into different types of pieces of image information.

The image sensor 11 consisting of a silicon material that is generally used in a visible wavelength range has such sensitivity characteristics that the sensitivity in a central wavelength range (near 550 nm) is higher than that in a short wavelength range (450 nm or less) and a long wavelength range (750 nm or more). Accordingly, in the case of using a plurality of band-pass filters corresponding to these wavelength ranges, it is preferable to arrange a neutral density filter on the optical axis on which the band-pass filters corresponding to the central wavelength range are arranged. In this case, the use of the polarization filter as the neutral density filter makes it possible to correct brightness balance in each image information and to simultaneously obtain wavelength information and polarization information.

The filter array FA may include at least two filters having different central wavelengths in the transmission wavelength range. In other words, the filter array FA may include a plurality of filters having the same transmission characteristics. For example, when the image capturing system 100 is used as a ranging apparatus (distance measuring device, stereo camera), object distance information is obtained using two pieces of image information with different parallax types. Therefore, it is desirable to set substantially the same transmission characteristics for the two filters corresponding to the pieces of image information. However, in order to obtain a larger number of pieces of different image information in one image capturing operation, it is desirable to set different transmission characteristics for all the plurality of filters.

As illustrated in FIG. 1B, the filter array FA according to the present exemplary embodiment includes nine filters F11 to F33 arranged in the X-direction and the Y-direction. The lens array LA includes nine lens portions corresponding to nine filters, respectively. Specifically, assuming that lens portions and filters arranged on the same optical axis are regarded as one image forming portion, the optical apparatus 20 includes nine image forming portions. A plurality of image forming portions is collectively referred to as an image forming portion array (first optical portion).

The number of image forming portions is not limited to this example, as long as the optical apparatus 20 includes at least three image forming portions arranged in a first direction. However, in order to obtain a larger number of pieces of image information corresponding to transmission characteristics in one image capturing operation, four or more image forming portions can be provided, or more preferably, nine or more image forming portions can be provided like in the present exemplary embodiment. Light from the object passes through the lens array LA and the filter array FA in this order and reaches the imaging plane of the image sensor 11. In this case, on the imaging plane, nine images (duplicated images) corresponding to the image forming portions, respectively, are formed.

To downsize the imaging apparatus 10, the lens portions can be provided with a common (single) image sensor, like the image sensor 11 according to the present exemplary embodiment. The use of the common image sensor for the lens portions makes it possible to obtain favorable image information even when the number of lens portions or the arrangement of the lens portions are changed in the case of replacing the optical apparatus 20. In this case, in order to improve the use efficiency of the image sensor 11, it is desirable to uniformly and closely arrange a plurality of pixels (photodiodes) constituting the image sensor 11.

However, image sensors may be individually provided for the respective lens portions, as needed. In this case, to downsize the entire apparatus, it is desirable to uniformly and closely arrange the image sensors. To downsize the optical apparatus 20, it is desirable to arrange the lens portions so as to match the shape of the image plane of the image sensor 11. Specifically, it is desirable to arrange the lens portions in a square shape on the X-Y plane. If the shape of the image plane of the image sensor 11 is not a square, for example, an aspect ratio of the lens portions to be arranged may be changed.

The order of arrangement of the lens array LA and the filter array FA in an optical axis direction is not limited to that illustrated in FIG. 1A. For example, in the case of using an interference band-pass filter, from the viewpoint of angle characteristics (angle dependence), the filter array FA can be arranged on the object side relative to the lens array LA so as to decrease the incident angle of light with respect to each filter. However, if each lens portion in the lens array LA has a sufficiently high telecentric property, the incident angle of light with respect to each filter can be decreased even when the filter array FA is arranged on the image size (+Z-side) relative to the lens array LA.

In a case where the filter array FA is arranged on the object side relative to the lens array LA, vignetting of an off-axis light beam incident on the lens array LA may occur. Accordingly, it is preferable to arrange the filter array FA on the image side relative to the lens array LA, for example, when a filter with a small angle dependence, such as an absorption band-pass filter, is used, or when the light use efficiency has priority over the angle dependence of each filter.

In the present exemplary embodiment, the lens array LA and the filter array FA are integrally held by the holding member 2, thereby limiting a relative positional deviation therebetween. The holding member 2 includes a first mount portion 21 for coupling with the imaging apparatus 10. This enables the optical apparatus 20 to be detachably attached to the imaging apparatus 10 as an accessory apparatus via the first mount portion 21. Specifically, the lens array LA and the filter array FA can be simultaneously replaced while being integrally held with respect to the imaging apparatus 10.

According to this configuration, it is possible to change the type or resolution of image information to be acquired, while limiting a relative positional deviation between the lens array LA and the filter array FA. Specifically, in the case or replacing the filter array FA with another filter array with different transmission characteristics, the lens array LA can be simultaneously replaced with the corresponding (optimized) filter array. Consequently, a variation in aberration or focus of each lens can be controlled. Further, the resolution of the image capturing system 100 can be changed by replacing the lens array LA with one in which the number of lens portions is different from the number of lens portions in the lens array LA. In this case as well, the filter array FA can be simultaneously replaced with the corresponding lens array.

Thus, in the image capturing system 100 according to the present exemplary embodiment, the optical apparatus 20 can be replaced depending on image information to be acquired. In particular, since the lens array LA is replaceable, the type (e.g., the number of bands) or resolution of image information can be increased or decreased by increasing or decreasing the number of lens portions. Further, since the lens array LA and the filter array FA can be integrally replaced, a variation in optical performance during the replacement can be suppressed. Accordingly, a plurality of pieces of favorable image information can be simultaneously acquired by the common imaging apparatus 10, regardless of the configuration of the optical apparatus 20.

The first mount portion 21 may be shaped corresponding to a mount portion 13 provided on the imaging apparatus 10. For example, a connecting portion (e.g., a convex portion, a concave portion, or a magnet) provided on the circumference of an imaging plane as viewed along the optical axis direction (Z-direction) can be employed as the first mount portion 21. FIG. 1A illustrates the first mount portion 21 as a concave portion and illustrates the mount portion 13 of the imaging apparatus 10 as a convex portion. However, the shape of the first mount portion 21 and the shape of the mount portion 13 are not limited to these examples. In addition, the first mount portion 21 can be provided with an electric contact (terminal) for electrically connecting with the imaging apparatus 10. This enables the optical apparatus 20 to communicate with the imaging apparatus 10 via the electric contact and to receive power from the imaging apparatus 10.

As illustrated in FIG. 1A, the holding member 2 may include not only the first mount portion 21 provided on the image side, but also a second mount portion 22 provided on the object side. This enables the accessory apparatus, such as the lens apparatus 40 or the adapter apparatus 30, to be detachably attached to the optical apparatus 20. While FIG. 1A illustrates the second mount portion 22 as a convex portion, the shape of the second mount portion 22 is not limited to this example, as long as the shape of the second mount portion 22 is set according to the shape of the mount portion on the attached accessory apparatus. Further, the second mount portion 22 can be provided with an electric contact for communication or power reception/supply with the accessory apparatus.

When the optical apparatus 20 is attached to the imaging apparatus 10, a mounting error may occur depending on the manufacturing accuracy of each mount portion and an error may occur in the positional relationship between the image sensor 11 and each of the lens array LA and the filter array FA. If these errors may occur, defocusing of the lens array LA on the imaging plane of the image sensor 11 may occur. Accordingly, it is desirable to provide a moving mechanism for moving the lens array LA in the optical axis direction so as to adjust focusing of the lens array LA.

Alternatively, a moving mechanism for moving the image sensor 11 in the optical axis direction may be provided instead of a moving mechanism for the lens array LA so that the focus adjustment (sensor focus) can be performed by moving the image sensor 11. There is a possibility that the image plane of the lens array LA may be tilted with respect to the imaging plane due to the attachment error of the optical apparatus 20, which may cause a curvature of field or different defocusing depending on the lens portion. Accordingly, it is preferable to employ a configuration in which the tilt (tilt angle) with respect to the optical axis of the image sensor 11 can be changed. Further, an image shake correction (hand shake correction) can be performed by moving the image sensor 11 in the direction including components vertical to the optical axis.

It is desirable for all the lens portions in the lens array LA to include the lens surface of the same shape. This facilitates manufacturing of each lens portion, which leads to a reduction in the cost of the lens array LA. In this case, the lens portions can have the same shape, but the lens portions may have different shapes, as needed. Further, each lens portion may consist of a plurality of lenses arranged on the optical axis so that chromatic aberration can be corrected more favorably. If a difference (use wavelength range of the image capturing system 100) in transmission wavelength range between filters is large and it is difficult to correct the chromatic aberration, image forming positions (axial chromatic aberrations) may be adjusted by individually moving the lenses.

The lens apparatus 40 according to the present exemplary embodiment includes an optical system OL including one or more lenses common to each image forming portion of the optical apparatus 20, and a holding member (lens barrel) 4 that holds the optical system OL. The lens apparatus 40 has a function of converting the field angle (image capturing field angle) of the image capturing system 100. Specifically, by replacing the lens apparatus 40 with another lens apparatus in which the configuration of the optical system OL is different from that of the lens apparatus 40, it is possible to acquire image information corresponding to various field angles. Alternatively, instead of using the lens apparatus 40, each lens portion in the lens array LA can consist of a plurality of lens units and the distance between adjacent lens units can be changed to change the field angle of the image capturing system 100. In this case, however, it becomes difficult to manufacture and control the lens array LA and the configuration of the optical apparatus 20 becomes complicated and larger in size.

Accordingly, in order to simplify and downsize the optical apparatus 20, it is desirable to employ a configuration in which the field angle of the image capturing system 100 can be changed by replacing the lens apparatus 40, like in the present exemplary embodiment. The focus adjustment (focusing) may be performed by making at least one lens constituting the optical system OL in the lens apparatus 40 to be movable. Further, the field angle or the image forming magnification can be adjusted by configuring the optical system OL using a plurality of lens units and changing the distance between adjacent lens units so that the focal length of the image capturing system 100 changes.

The adapter apparatus 30 according to the present exemplary embodiment includes a diffusion element DF that diffuses light, an optical system (second optical portion) CL including one or more lenses common to each image forming portion (first optical portion) of the optical apparatus 20, and a holding member 3 that holds the diffusion element DF and the optical system CL. The diffusion element DF is arranged in an intermediate image plane (primary imaging plane) formed by the lens apparatus 40, and functions as a screen. As the diffusion element DF, for example, a microlens array consisting of a diffusion member (diffusing plate), including a diffusion surface (rough surface), and a plurality of fine lenses can be employed. The optical system CL has the function of a collimator optical system that converts light from the diffusion element DF into parallel light and guides the light to the optical apparatus 20. The parallel light is not limited to parallel light in a strict sense, but instead may include substantial parallel light (weak diverging light or weak convergent light).

As described above, the transmission wavelength of the interference band-pass filter has an angle dependence, and a variation in the central wavelength in the transmission wavelength range generally increases toward the long wavelength side. When the band-pass filter is arranged at a position remote from the main optical axis AX0, the angle of light incident on the band-pass filter is likely to increase, which may lead to an increase in a fluctuation angle of the central wavelength in the transmission wavelength range. Since incident light on the filter array FA via the adapter apparatus 30 is converted into parallel light, the incident angles of light with respect to each filter becomes substantially equal regardless of the position. Therefore, a variation in the angle dependence due to the arrangement of filters can be limited.

The holding member 4 of the lens apparatus 40 and the holding member 3 in the adapter apparatus 30 include a mount portion 41 and a mount portion 31, respectively, to couple the holding member 4 and the holding member 3 to each other. Thus, the lens apparatus 40 can be detachably attached to the optical apparatus 20 via the adapter apparatus 30. The holding member 3 in the adapter apparatus 30 includes a mount portion 33 for coupling the holding member 3 with the second mount portion 22 of the optical apparatus 20. Accordingly, the adapter apparatus 30 can be detachably attached to the optical apparatus 20 via each mount portion. In this case, even when the lens apparatus 40 cannot be directly detachably attached to the imaging apparatus 10 and the optical apparatus 20, the lens apparatus 40 can be indirectly detachably attached to the imaging apparatus 10 and the optical apparatus 20 via the adapter apparatus 30.

However, it is desirable that the first mount portion 21 of the optical apparatus 20 and the mount portion 41 of the lens apparatus 40 have the same shape and the mount portion 13 of the imaging apparatus 10 and the mount portion 31 of the adapter apparatus 30 have the same shape. In other words, the lens apparatus 40 that is detachably attachable to the imaging apparatus 10 is desirably configured to be detachably attachable to the adapter apparatus 30. Thus, it is possible to configure an image capturing system capable of simultaneously acquiring a plurality of pieces of image information in one image capturing operation by using the imaging apparatus 10 as a general camera and the lens apparatus 40 as a general interchangeable lens.

Further, the image capturing system 100 according to the present exemplary embodiment has a configuration in which parallel light is incident on the optical apparatus 20 by using the adapter apparatus 30. Thus, the optical apparatus 20 according to the present exemplary embodiment can also be applied to a lens apparatus configured not to form an intermediate image of an object. Therefore, in order to ensure the compatibility among the optical apparatus 20, the adapter apparatus 30, and the lens apparatus 40, the mount portions of each apparatus desirably have the same shape, regardless of the configuration of each optical system.

In the case of using a lens apparatus that forms an intermediate image of an object, like the lens apparatus 40 according to the present exemplary embodiment, it is desirable to arrange a field stop at the position of the intermediate image. In this way, the shape and size of the boundary of each image formed on the image plane of the image sensor 11 can be appropriately set. For example, if light beams from each image forming portion interfere with each other on the imaging plane, the size (aperture diameter) of an aperture provided in the field stop can be reduced. In this case, in order to improve the use efficiency of the image sensor 11, the aperture of the field stop desirably has a shape, such as a rectangular shape, which can equally divide the imaging plane.

The boundary of each image formed on the imaging plane becomes clearer as the field stop approaches the position of the intermediate image. Accordingly, in the case of arranging the diffusion element DF at the position of the intermediate image, like in the present exemplary embodiment, it is preferable to arrange the field stop so as to be brought into close contact with the diffusion element DF. In this case, if the diffusion element DF has a certain thickness, it is preferable to arrange the field stop on the image side of the diffusion element DF so as to reduce the effect of scatter in the diffusion element DF. In the present exemplary embodiment, a light-shielding member (light-shielding paint) is provided at a location other than a central portion (rectangular portion) of the diffusion element DF, thereby providing the diffusion element DF with the function of the field stop. Alternatively, the field stop and the diffusion element DF may be integrally formed by arranging the diffusion element DF at an aperture portion provided on the light-shielding member constituting the field stop.

In a case where the diffusion element DF is arranged at the position of the intermediate image, the light from the lens apparatus 40 is diffused by the diffusion element DF. Accordingly, information about the incident angle of the light from the lens apparatus 40 is lost, and as a result, the occurrence of parallax in each image is controlled. However, in a case where the image capturing system 100 according to the present exemplary embodiment is used as a ranging apparatus, information about a distance to an object is acquired using parallax of each image. Accordingly, the information about the incident angle of light from the lens apparatus 40 needs to be retained. In this case, a positive lens, instead of the diffusion element DF, is arranged as a field lens immediately before the field stop, thereby implementing a function similar to that of the present exemplary embodiment while retaining the information about the incident angle.

In the image capturing system 100 according to the present exemplary embodiment, each apparatus (each optical system) and the imaging apparatus 10 are detachably attachable, but instead may be integrally formed to thereby eliminate the occurrence of a mounting error. For example, a single lens apparatus (accessory apparatus) that is detachably attachable to the imaging apparatus 10 may be configured by integrally forming the optical apparatus 20 and the lens apparatus 40. Alternatively, the optical apparatus 20 and the adapter apparatus 30 can be formed integrally as a single adapter apparatus (accessory apparatus) that is detachably attachable to the imaging apparatus 10 and the lens apparatus 40.

Next, a processing system in the image capturing system 100 will be described. As described above, the characteristics of the image information output from the image sensor 11 vary depending on the configuration of the optical apparatus 20 to be attached to the imaging apparatus 10. Therefore, it is desirable to implement a system for appropriately processing image information regardless of what kind of optical apparatus 20 is attached to the imaging apparatus 10. Specifically, the optical apparatus 20 preferably includes a communication unit for transmitting and receiving information to and from the imaging apparatus 10, and a recognition unit for recognizing a connection with the imaging apparatus 10.

FIG. 1A illustrates a case where the imaging apparatus 10 includes a processing unit 12 and the optical apparatus 20 includes a processing unit 23. The processing unit 12 includes at least functions of a communication unit and a recognition unit. The processing unit 23 includes at least a function of a communication unit (storage unit). The processing unit 12 and the processing unit 23 are electrically connected to each other when the optical apparatus 20 is attached to the imaging apparatus 10, and can mutually transmit and receive information (signal). The processing unit 12 and the processing unit 23 can transmit or receive information via the electric contacts provided on the mount portions of the imaging apparatus 10 and the optical apparatus 20. However, for example, in a case where each mount portion is not provided with an electric contact, a wireless communication, such as an optical communication, may be established.

The processing unit 23 stores unique information about the optical apparatus 20. Upon receiving the unique information, the processing unit 12 recognizes that the optical apparatus 20 is attached to the imaging apparatus 10. Examples of the unique information about the optical apparatus 20 include an identifier (ID), such as an identification number for each of the lens array LA and the filter array FA, or an identifier for a combination of the lens array LA and the filter array FA. The processing unit 23 can recognize the type or individual piece of the optical apparatus 20 based on the received unique information.

In the image capturing system 100 according to the present exemplary embodiment, the imaging apparatus 10 includes a power supply while the optical apparatus 20 does not includes a power supply. Accordingly, it is desirable for the processing unit 12 in the imaging apparatus 10 to recognize the attachment of the optical apparatus 20. In this case, the processing unit 23 only has the function of a storage unit (communication unit) for storing the unique information. However, in a case where the processing unit 12 and the processing unit 23 communicate wirelessly, the configuration may be such that the imaging apparatus 10 and the optical apparatus 20 are each provided with a power supply and the imaging apparatus 10 and the optical apparatus 20 recognize each other individually.

The processing unit 12 also includes the function of an image processing unit (processor), and processes image information output from the image sensor 11 based on the received unique information. In this case, it is desirable to preliminarily associate the unique information with information (such as the number of lens portions and the arrangement of lens portions) about the lens array LA in the optical apparatus 20, or information (such as transmission characteristics and arrangement of filters) about the filter array FA, and to record the information on the processing unit 12 or an external apparatus as a data table. This enables the processing unit 12 to recognize the configuration (characteristics) of the attached optical apparatus 20 by comparing the received unique information with the data table.

A configuration in which the information about the lens array LA and the filter array FA as described above is recorded, as needed, on the processing unit 23 as unique information and the processing unit 12 acquires the information from the processing unit 23 may be employed. However, in order to simplify and downsize the optical apparatus 20, it is desirable to minimize the amount of information, such as the identification number for identifying the type or individual piece of the optical apparatus 20 as described above, to be recorded on the processing unit 23.

For example, when the filter array FA consists of a band-pass filter, the processing unit 12 appropriately separates and re-arranges a single piece of image information output from the image sensor 11 based on the information about the lens array LA and the filter array FA. Thus, a plurality of pieces of image information (multispectral image) for each wavelength range corresponding to the band-pass filter can be generated. In this case, a single multispectral image may be generated, as needed, by superimposing (re-combining) a plurality of pieces of image information.

A configuration in which image processing as described above is performed by an external apparatus instead of the processing unit 12 by transmitting the image information output from the image sensor 11 to the external apparatus. In this case, to facilitate understanding of the correspondence between information about the optical apparatus 20 and image information, the information stored in the processing unit 23 can be transmitted to the external apparatus after adding the information to the image information. Alternatively, the processing unit 23 may be provided outside of the imaging apparatus 10 as the external apparatus.

The lens apparatus 40 desirably includes a processing unit 42 similar to the processing unit 23 in the optical apparatus 20. The processing unit 42 can store the unique information about the lens apparatus 40, and can transmit the unique information to the processing unit 12 in the imaging apparatus 10 via the processing unit 23 in the optical apparatus 20, or directly to the processing unit 12 in the imaging apparatus 10. The processing unit 12 can recognize the type or individual piece of the lens apparatus 40 based on the unique information about the lens apparatus 40. The processing unit 12 can process the image information output from the image sensor 11 based on at least one of the unique information about the lens apparatus 40 and the unique information about the optical apparatus 20.

The adapter apparatus 30 desirably includes a processing unit 34 similar to the processing unit 23 in the optical apparatus 20. The processing unit 34 can store the unique information about the adapter apparatus 30, and can transmit the unique information to the processing unit 12 in the imaging apparatus 10 via the processing unit 23 in the optical apparatus 20, or directly to the processing unit 12 in the imaging apparatus 10. The processing unit 12 can recognize the type or individual piece of the lens apparatus 40 based on the unique information about the adapter apparatus 30. Further, the processing unit 12 can process the image information output from the image sensor 11 based on the unique information about at least one of the lens apparatus 40, the adapter apparatus 30, and the optical apparatus 20. In this case, the effect of an aberration generated in the lens apparatus 40 on the image information may be corrected using the unique information about the lens apparatus 40.

Figure 2:
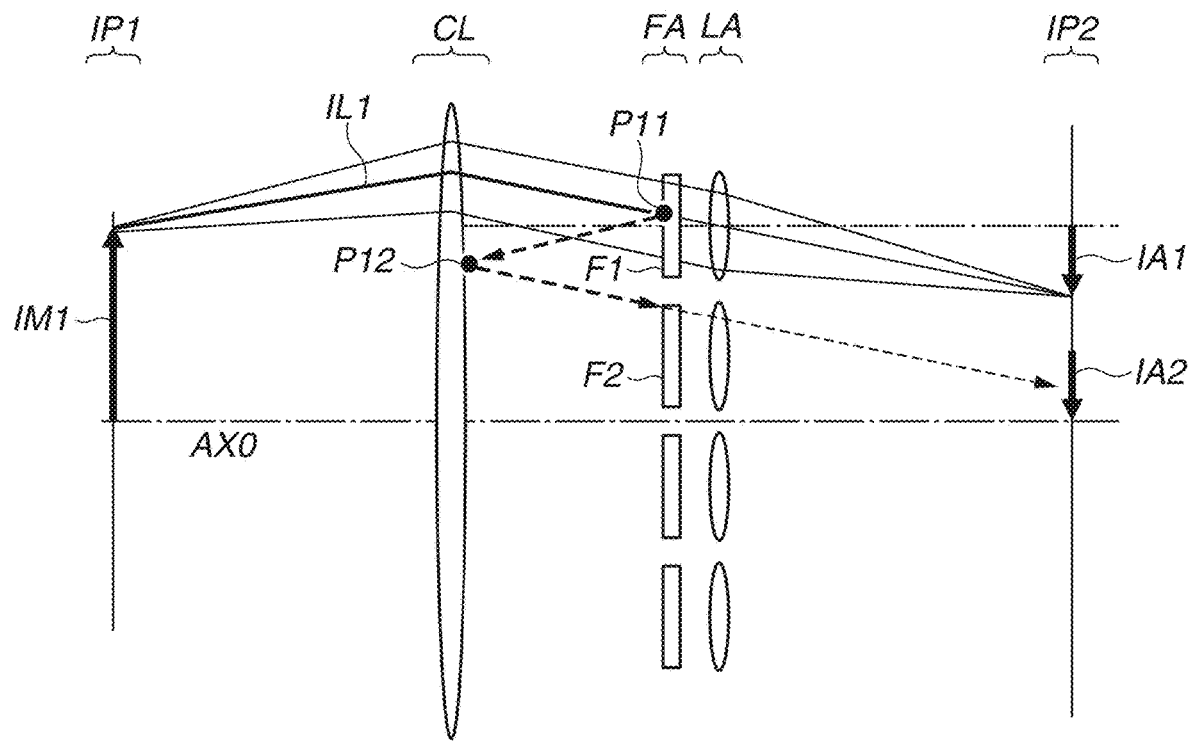
FIG. 2 illustrates an optical path for stray light reflected by a filter.

Next, stray light reflected by the filter array FA will be described. FIG. 2 is a schematic diagram illustrating a state where a light beam from an image plane IP1 (intermediate image IM1) of a lens apparatus (not illustrated) is incident on an image plane IP2, which is a final imaging plane, via the optical system CL, the filter array FA, and the lens array LA. If the lens apparatus is not arranged on the object side of the optical system CL, a subject is arranged at the position of the intermediate image IM1 and the image plane IP1 serves as an object surface. In the following description, a light beam IL, which is one of the light beams output from the intermediate image IM1, is focused.

The light beam IL output from the intermediate image IM1 is incident on a point P11 of a filter F1 in the filter array FA via the optical system CL. In this case, a part of the light beam IL is reflected at the point P11 and is then returned to a point P12 on the optical surface of the optical system CL. In particular, when the filter F1 is an interference band-pass filter, almost all the light beams (light beams that do not contribute to the formation of an image IA1) in transmission wavelength ranges other than the transmission wavelength range of the filter F1 are reflected by the filter F1. In FIG. 2, an effective light beam (image forming light beam) that contributes the image formation in the light beam IL is indicated by a solid line, and stray light reflected at the point P11 is indicated by a broken line.

Most part of the stray light incident on the point P12 travels toward the object side via the optical system CL, but a part of the stray light is reflected at the point P12 again and enters the filter array FA again. FIG. 2 illustrates a case where the stray light reflected at the point P12 is incident on a filter F2 adjacent to the filter F1. A light beam in the transmission wavelength range of the filter F2 in the stray light incident on the filter F2 reaches the image plane IP2, and is superimposed on an image IA2 which is formed by an effective light beam. In this case, stray light may appear as a ghost superimposed on the image IA2 in the image information acquired, which may cause deterioration in the image quality of the image information. Alternatively, in a case where spectral information is acquired using the image information, unnecessary brightness is added to the image IA2, so that favorable spectral information cannot be obtained (dispersion accuracy deteriorates).

Accordingly, in the present exemplary embodiment, the optical system CL and the filter array FA are appropriately arranged, thereby suppressing the occurrence of a ghost due to stray light reflected by the filter array FA. A specific arrangement of the optical system CL and the filter array FA according to the present exemplary embodiment will be described in detail below.

Figure 3:
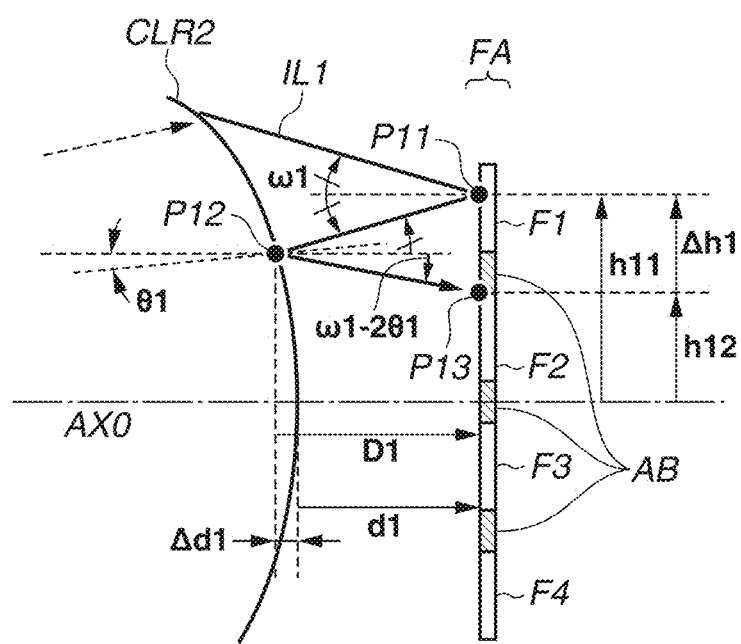
FIG. 3 is a first schematic diagram illustrating an optical system according to an exemplary embodiment.

FIG. 3 is an enlarged schematic diagram illustrating a part of an optical surface CLR2 and the filter array FA in the optical system CL. FIG. 3 illustrates an optical path of the light beam IL1 that enters from the opposite side (upper side) of the main optical axis AX0 with respect to the point P11 (first point) of the filter F1 (first filter) among the light beams entering from the object side. In the same plane as filters F1 to F4, a light-shielding wall (first light-shielding member) AB that shields light is disposed between adjacent filters.

A light beam in a transmission wavelength range other than the transmission wavelength range of the filter F1 in the light beam IL1 incident on the point P11 is reflected at the point P11 and incident on the point P12 (second point) of the optical surface CLR2. If an angle (incident angle of the light beam IL1 with respect to the filter F1) formed between the light beam IL1 incident on the point P11 and the main optical axis AX0 is represented by ω1 [deg], a reflection angle of the light beam IL1 with respect to the filter F1 is represented by ω1 [deg] in accordance with the law of reflection.

A part of the light beam IL1 incident on the point P12 is reflected and incident on a point P13 in the filter array FA. The reflection angle of the light beam IL1 at the point P12 is determined by an angle (normal line angle at the point P12) θ1 [deg] formed between the main optical axis AX0 and a normal line to the optical surface CLR2 at the point P12. For example, in a case where the normal line angle θ1 is 0 [deg], the normal line to the optical surface CLR2 at the point P12 and the main optical axis AX0 (plane normal line of the filter array FA) are parallel. Accordingly, the reflection angle of the light beam IL1 at the point P12 is ω1 [deg].

On the other hand, in a case where the normal line angle θ1 is greater than 0 [deg], that is, when the normal line to the optical surface CLR2 at the point P12 is tilted with respect to the main optical axis AX0, the reflection angle of the light beam IL1 at the point P12 is changed, with respect to ω1, by an angle that is twice as large as the normal line angle θ1 in accordance with the law of reflection. Therefore, the angle formed between the main optical axis AX0 and the light beam IL1 reflected at the point P12 is represented by ω1−2×θ1.

To suppress the occurrence of a ghost in the image information, the light beam IL1 (stray light) reflected at the point P11 of the filter F1 is prevented from entering another filter. Specifically, the point P13 where the light beam IL1 reflected at the point P12 enters may be located in an area outside the effective area of a filter other than the filter F1. The term "effective area" used herein refers to an area (aperture portion of the filter array FA) through which the effective light beam that contributes to the formation of an image of an object in each filter passes. In the present exemplary embodiment, unless otherwise noted, the term "a filter" indicates "an effective area of a filter".

Accordingly, in the present exemplary embodiment, the optical system CL and the filter array FA are arranged in such a manner that the point P13 is located at a position on the opposite side (upper side) of the main optical axis AX0 relative to the filter F2 (second filter) adjacent to the side (lower side) of the filter F1 toward the main optical axis AX0. As illustrated in FIG. 3, the light-shielding wall AB is arranged between the filter F1 and the filter F2, thereby preventing the light beam IL1 reflected at the point P12 from reaching the image plane IP2. Instead of the light-shielding wall AB, the light-shielding member may be arranged at the object side or the image side relative to the filter array FA. However, in order to suppress the reflection of stray light on the lens array LA adjacent to the filter array FA, and to favorably maintain the relative position between each filter and the light-shielding wall AB, it is desirable to arrange the light-shielding wall AB between filters.

Next, a condition in which the point P13 is located on the opposite side of the main optical axis AX0 relative to the filter F2 will be described. If a distance in the optical axis direction from the filter F1 to the point P12 is represented by D1 [mm], a distance from the point P11 to the main optical axis AX0 is represented by h11 [mm], and a distance to the main optical axis AX0 from an edge of the filter F2 facing the filter F1 is represented by h12 [mm], the following conditional expression (A1) may be satisfied based on geometric conditions.

$$h11 - D1 \times \{\tan(\omega1 - 2 \times \theta1)\} > h12 \qquad (A1)$$

The left-hand side of the conditional expression (A1) represents the height of the point P13 with respect to the main optical axis AX0. When the conditional expression (A1) is transformed, the following conditional expression (A2) is obtained.

$$h11 - h12 > D1 \times \{\tan \omega1 + \tan(\omega1 - 2 \times \theta1)\} \qquad (A2)$$

When Δh1=h11−h12 holds and the conditional expression (A2) is solved in terms of the normal line angle θ1, the following conditional expression (1) is derived.

[Expression 2]

$$\frac{1}{2} \times \arctan\left\{\frac{2 \times \tan\omega1 - \frac{\Delta h1}{D1}}{1 - \tan\omega1 \times \left(\tan\omega1 - \frac{\Delta h1}{D1}\right)}\right\} < \theta1 \qquad (1)$$

In the present exemplary embodiment, the normal line angle θ1 at the point P12 on the optical surface CLR2 is set so as to satisfy the conditional expression (1) described above, thereby preventing stray light from the filter F1 from entering another filter.

The shape (size or curvature radius) of the optical surface CLR2 can be arbitrarily determined. The optical surface CLR2 may have a spherical surface or an aspherical surface (free-form surface). However, when the optical surface CLR2 has a spherical surface with an extremely small curvature radius, the optical path of a light beam passing through a position remote from the main optical axis AX0 of the optical surface CLR2 deviates from a paraxial optical path, so that higher-order aberrations are likely to occur. A small curvature radius of the optical surface CLR2 indicates that the normal line angle θ1 is large. Also, in a case where the optical surface CLR2 is an aspherical surface, a problem similar to that described above occurs if the curvature radius (local curvature radius) at the point P12 is extremely small.

Accordingly, to facilitate the correction of aberrations, it is desirable to reduce the normal line angle θ1 to a certain extent. Specifically, the following conditional expression (1a) is desirably satisfied.

[Expression 3]

$$\frac{1}{2} \times \arctan\left\{\frac{2 \times \tan\omega1 - \frac{\Delta h1}{D1}}{1 - \tan\omega1 \times \left(\tan\omega1 - \frac{\Delta h1}{D1}\right)}\right\} < \theta1 \leq 60 \qquad (1a)$$

Further, it is more preferable to satisfy the following conditional expressions (1b) to (1d) in this order.

[Expression 4]

$$\frac{1}{2} \times \arctan\left\{\frac{2 \times \tan\omega1 - \frac{\Delta h1}{D1}}{1 - \tan\omega1 \times \left(\tan\omega1 - \frac{\Delta h1}{D1}\right)}\right\} < \theta1 \leq 45 \qquad (1b)$$

[Expression 5]

$$\frac{1}{2} \times \arctan\left\{\frac{2 \times \tan\omega1 - \frac{\Delta h1}{D1}}{1 - \tan\omega1 \times \left(\tan\omega1 - \frac{\Delta h1}{D1}\right)}\right\} < \theta1 \leq 40 \qquad (1c)$$

-continued

[Expression 6]

$$\frac{1}{2} \times \arctan\left\{\frac{2 \times \tan\omega 1 - \frac{\Delta h1}{D1}}{1 - \tan\omega 1 \times \left(\tan\omega 1 - \frac{\Delta h1}{D1}\right)}\right\} < \theta 1 \leq 35 \quad (1d)$$

The point P11 described above indicates any point on the filter F1. In this case, it is more preferable to satisfy the conditional expression (1) described above at all points on the filter F1. However, depending on the intended use of the image information, the occurrence of a certain level of ghost can be allowed. Therefore, advantageous effects of the present exemplary embodiment can be obtained if the conditional expression (1) can be satisfied at least one of the points on the filter F1.

Figure 4A:
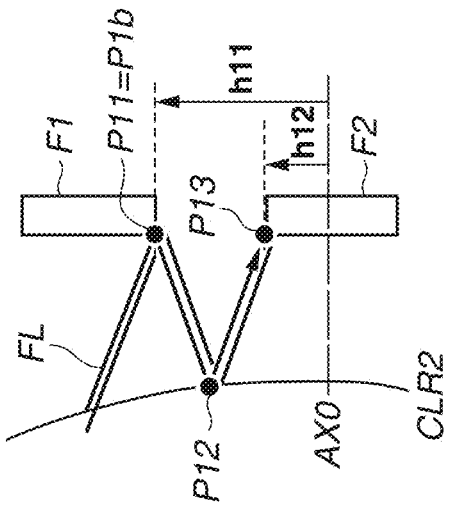
FIGS. 4A, 4B, and 4C each illustrate a relationship between stray light and a position of an incident point of a light beam on each filter.
Figure 4B:
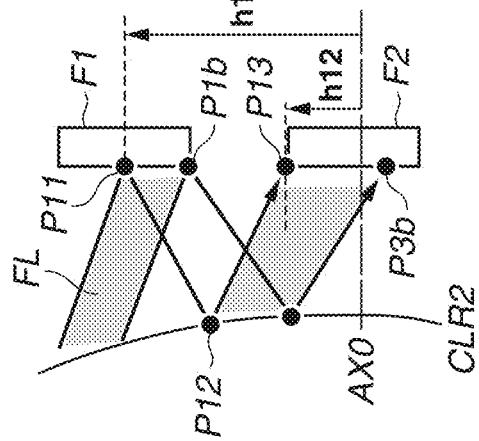
Figure 4C:
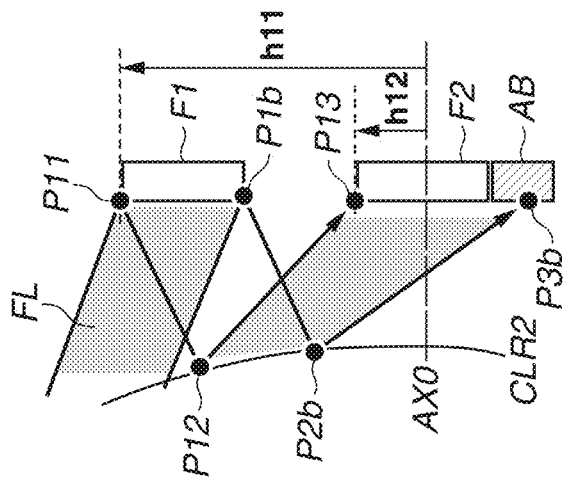

Next, the relationship between the position of the point P11 and the width (width of luminous flux) will be described with reference to FIGS. 4A to 4C. FIGS. 4A to 4C are schematic diagrams each illustrating a case where the normal line angle θ1 is set in such a manner that the point P13 is located at an edge (height position h12 from the main optical axis AX0) of the filter F2 facing the filter F1 based on the conditional expression (1) described above. In other words, FIGS. 4A to 4C each illustrate a case where the light beam reflected at the point P11 is incident on a boundary at which the light beam barely enters the filter F2. FIGS. 4A to 4C each illustrate a case where the light beams entering the filter F1 have equal incident angles.

FIG. 4A illustrates a case where the point P11 is located at a position (edge on the opposite side of the main optical axis AX0) of the filter F1 farthest from the main optical axis AX0. In FIG. 4A, a light beam reflected at a point P1b at an edge of the filter F1 closer to the main optical axis AX0 is reflected at a point P2b on the optical surface CLR2 and is incident on a point P3b at a side (light-shielding wall AB) lower than the filter F2. Thus, in the configuration illustrated in FIG. 4A, most part of stray light FL reflected on the entire surface (from the point P11 to the point P1b) of the filter F1 enters the filter F2.

In this case, in order to reduce the adverse effect of the stray light on the image information, it is desirable to set the area of the light-shielding wall AB to be sufficiently larger than the area of the filter F2. The area of each filter can also be referred to as the effective diameter (in the direction vertical to the main optical axis AX0) of each filter. The width of the stray light FL is determined by the area of the filter F1, and thus the effective diameter of the filter F1 is desirably smaller than the effective diameter of the filter F2. For example, if the ratio of the effective diameter of the filter F2 to the effective diameter of the filter F1 is 75%, 25% of the stray light FL is shielded by the light-shielding wall AB without entering the filter F2.

FIG. 4B illustrates a case where the point P11 is located at the center of the filter F1 in the direction vertical to the main optical axis AX0. In other words, the light beam incident at a position higher than the point P11 of the filter F1 illustrated in FIG. 4B does not enter the filter F2, and thus the light beam does not become stray light which causes a ghost. In FIG. 4B, the light beam incident on the point P1b of the filter F1 is incident on the point P3b which is located substantially at the center of the filter F2.

In this case, the ratio of the stray light FL to the light beam (incident light beam) incident on the entire surface of the filter F1 can be represented by the ratio of the distance from the point P11 to the point P1b to the effective diameter of the filter F1. Accordingly, the position of the point P11 may be set depending on the amount of the stray light FL to be reduced with respect to the incident light beam. In the case of the configuration illustrated in FIG. 4B, since the point P11 is located at the center of the filter F1, the ratio of the distance from the point P11 to the point P1b to the effective diameter of the filter F1 is 50%. Therefore, the stray light FL can be halved with respect to the incident light beam. For this reason, the incident point (point P11) farthest from the main optical axis AX0 of the filter F1 is desirably located at a position within the range from the center of the filter F1 to the edge (point P1b) closer to the main optical axis AX0.

A reflectance at an interface between a general glass material and air is about several percent. Accordingly, the intensity of the stray light FL reflected by the filter F1 is attenuated by the optical surface CLR2. For example, in a case where the reflectance of the optical surface CLR2 is 1% and the ratio of the stray light FL to the incident light beam is 10%, the intensity of the stray light FL at the time the stray light FL enters the filter F2 is reduced to ¹/₁₀₀₀ (0.01×0.1) of the intensity obtained before the stray light FL is reflected by the optical surface CLR2. Accordingly, if the ratio of the stray light FL to the incident light beam is 10% or less, the effect of the stray light FL on the image information is sufficiently small. Therefore, it is more preferable that the ratio of the distance from the point P11 to the point P1b to the effective diameter of the filter F1 be less than or equal to 10%.

FIG. 4C illustrates a case where the point P11 is located at an edge of the filter F1 that is closer to the main optical axis AX0, that is, a case where the point P11 matches the point P1b. In this configuration, in a case where the conditional expression (1) described above is satisfied, the entire stray light FL reflected by the filter F1 is shielded by the light-shielding wall AB (not illustrated) without entering the filter F2. Therefore, in order to obtain more advantageous effects of the present exemplary embodiment, it is desirable to match the point P11 with the P1b as illustrated in FIG. 4C.

As described above, among the stray light FL reflected by the filter F1L, light beams that do not enter the filter F2 are desirably shielded by the light-shielding wall AB. As the light-shielding wall AB, a light-shielding wall made of a light-absorbing material having light-absorbing characteristics on the surface thereof, or including a light-absorbing structure can be used. For example, if the stray light FL includes infrared light, there is a possibility that the stray light FL cannot be sufficiently absorbed by a general black pigment. Accordingly, a fine uneven structure or the like may be employed. In this case, the light-shielding wall AB may be configured to absorb at least the stray light FL reflected by the filter F1.

FIGS. 5A and 5B are enlarged schematic diagrams illustrating a part of the optical surface CLR2 and the filter array FA, like FIG. 3.

Unlike FIG. 3, FIG. 5A illustrates a case where the normal line angle θ1 is large to some extent and the point P13 is located on the filter F1. The wavelength of the light beam reflected at the point P12 is substantially the same as the wavelength of the light beam reflected at the point P11. Therefore, it can be regarded that almost all the light beams from the point P12 are reflected at the point P13 again. Since the transmission wavelength of each optical member has an angle dependence, not all the light beams are reflected.

The light beams reflected at the point P13 travel toward the optical surface CLR2 again, and most of the light beams are incident above the point P12 relative to the main optical axis AX0. FIG. 5A illustrates the light beam incident on a point P14 on the optical surface CLR2 among the light beams reflected at the point P13. The normal line angle of the optical surface CLR2 at the point P14 is generally greater than the normal line angle θ1 of the optical surface CLR2 at the point P12. Accordingly, the light beam reflected at the point P14 travels toward an area above the filter array FA relative to the main optical axis AX0.

Therefore, it is desirable to provide the inner wall of each holding member for holding each optical system with a light-shielding surface (second light-shielding member) BS for shielding the light beams reflected by the optical surface CLR2. As described above, it may be difficult for the general holding member (lens barrel) to shield the light beams depending on the wavelength of stray light. Accordingly, like the material of the light-shielding wall AB described above, it is desirable to select the material of the light-shielding surface BS depending on stray light that may be generated.

FIG. 5B illustrates a case where the normal line angle θ1 is greater than that illustrated in FIG. 5A and the point P13 is located above the filter array FA. In this case, the light beam reflected at the point P12 travels toward an area above the filter array FA, like the light beam reflected at the point P14 illustrated in FIG. 5A. Accordingly, like in FIG. 5A, it is desirable to provide the light-shielding surface BS for shielding the light beam reflected at the point P12.

Figure 6:
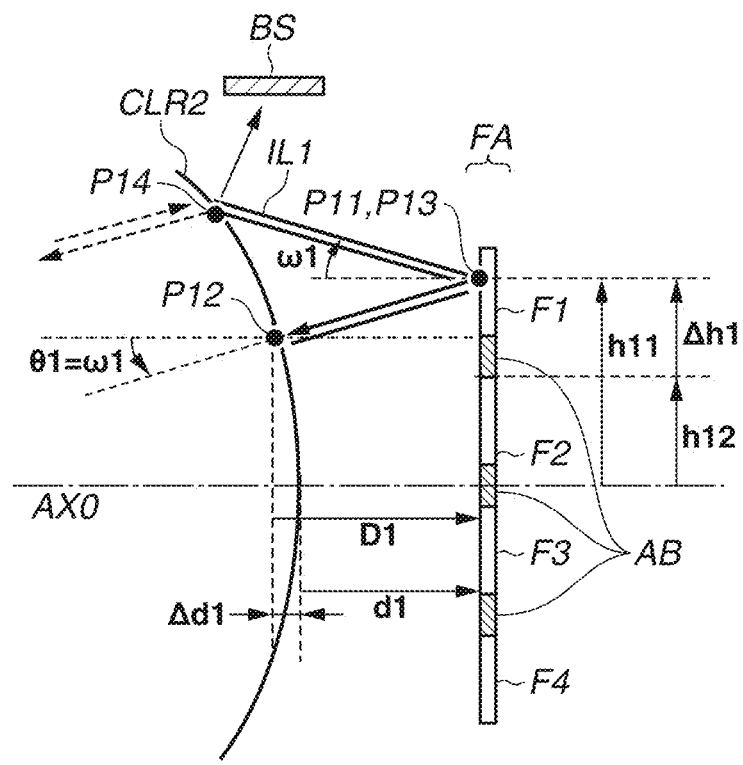
FIG. 6 is a third schematic diagram illustrating the optical system according to the exemplary embodiment.

FIG. 6 illustrates a case where the normal line angle θ1 of the optical surface CLR2 at the point P12 matches the incident angle ω1 of the light beam IL1 with respect to the filter F1. In this case, the normal line angle θ1 also matches the incident angle ω1 of the light beam traveling from the point P11 to the point P12, and thus the light beam reflected at the point P12 also passes through the same path and reaches the point P11. In other words, the point P11 and the point P13 match in FIG. 6. The light beam reflected at the point P13 is incident on the point P14 of the optical surface CLR2 and is reflected and shielded by the light-shielding surface BS.

If the curvature radius (local curvature radius) of the optical surface CLR2 at the point P12 is represented by R [mm], and a distance from a virtual spherical surface (obtained by approximating the optical surface CLR2 with the spherical surface) of the curvature radius R including the point P12 to the filter array FA is represented by d1 [mm], the conditional expression (A1) described above can be simplified as the following conditional expression (A3).

$$h11 > (R+d1) \times \tan \omega 1 \quad (A3)$$

The following conditional expression (A4) is derived by transforming the conditional expression (A3).

$$R < h11/\tan \omega 1 - d1 \quad (A4)$$

The conditional expression (A4) is included in the conditional expression (1) described above. The curvature radius R of the optical surface CLR2 is set so as to satisfy the conditional expression (A4), thereby obtaining the advantageous effects of the present exemplary embodiment. The conditional expression (A4) described above can be transformed into the following conditional expression (2).

$$R/h11 < 1/\tan \omega 1 - d1/h11 \quad (2)$$

As described above, to facilitate the correction of aberrations, it is desirable to increase the curvature radius R to some extent. Accordingly, it is desirable to satisfy the following conditional expression (2a).

$$0.5 \leq R/h11 < 1/\tan \omega 1 - d1/h11 \quad (2a)$$

Further, it is preferable to satisfy the following conditional expressions (2b) to (2d) in this order.

$$1.0 \leq R/h11 < 1/\tan \omega 1 - d1/h11 \quad (2b)$$

$$2.0 \leq R/h11 < 1/\tan \omega 1 - d1/h11 \quad (2c)$$

$$2.5 \leq R/h11 < 1/\tan \omega 1 - d1/h11 \quad (2d)$$

In order to favorably shield the stray light, the incident angle ω1 of the light beam IL1 with respect to the filter F1 desirably satisfies the following conditional expression (3).

$$0 < \omega 1 \leq 45 \quad (3)$$

However, if the transmission wavelength of the filter F1 has an angle dependence, it is preferable that the incident angle ω1 be small to some extent to obtain more favorable image information. It is preferable to satisfy the following conditional expressions (3a) to (3c) in this order.

$$0 < \omega 1 \leq 30 \quad (3a)$$

$$0 < \omega 1 \leq 20 \quad (3b)$$

$$0 < \omega 1 \leq 10 \quad (3c)$$

The intensity of the stray light is exponentially attenuated as the number of reflections on each optical surface increases. As described above, the reflectance of a general glass material is sufficiently low. Accordingly, if the stray light is repeatedly reflected a sufficiently large number of times between the optical surface CLR2 and the filter array FA, the effect of the intensity of the stray light on the image information becomes negligibly small. In this case, the number of reflections at which the intensity of the stray light becomes sufficiently low will be referred to as a maximum number of reflections (maximum number of reciprocations).

The smaller the reflectance of the optical surface CLR2 or the filter array FA is, the fewer the maximum number of reflections is. On the other hand, if it is necessary to attenuate the stray light to near the detection limit of the image sensor, for example, if a high dispersion accuracy is required, the maximum number of reflections increases. As described above, since a reflectance at an interface between a general glass material and air is about several percent, the maximum number of reflections is approximately three or four.

However, if a large number of filters on which the light beam IL1 is incident are adjacent, repeatedly reflected stray light is more likely to be transmitted through some of the filters. Accordingly, it is desirable to minimize the maximum number of reflections. Therefore, in order to minimize the reflectance of optical surface CLR2, it is desirable to provide the optical surface CLR2 with an antireflection structure. As the antireflection structure, for example, an antireflection film consisting of a multilayer, a fine particle film consisting of a material including fine particles, and a fine concave-convex structure called a moth-eye structure or the like can be employed.

In order to reduce the possibility of the stray light entering adjacent filters, it is desirable to arrange the filter F1 that satisfies the above-described conditional expressions at a position farthest from the main optical axis AX0 in the filter array FA. In other words, the light beam IL1 to be incident on the point P11 of the filter F1 is desirably an (outermost) light beam (outermost off-axis ray) farthest from the main optical axis AX0 in the image capturing field angle. However, the light beam IL1 is not limited to the outermost off-axis ray, and the conditional expressions may be satisfied by any light beam.

As described above, the filter array FA may include a plurality of filters having different central wavelengths in the transmission wavelength range. In this case, the shorter the central wavelength in the transmission wavelength range of the filter is, the more difficult it is to correct an aberration (chromatic aberration) in the lens portion corresponding to the wavelength range. Accordingly, in a case where the filter corresponding to the short wavelength range is arranged at a position remote from the main optical axis AX0, a decentering aberration is added to the aberration caused due to the transmission wavelength, which makes it difficult to obtain favorable image information corresponding to the short wavelength range. Therefore, it is desirable to arrange the filter corresponding to the short wavelength range at a position closer to the main optical axis AX0 than the filter corresponding to the long wavelength range is.

For example, if the central wavelength in the transmission wavelength range of the filter F1 is different from that of the filter F2, it is desirable to set the central wavelength in the transmission wavelength range of the filter F1, which is arranged at a position farther from the main optical axis AX0, longer than the central wavelength in the transmission wavelength range of the filter F2. It is known that the sensitivity of a general image sensor arranged on an image plane in the short wavelength range is higher than that in the long wavelength range. Accordingly, as described above, when the filter F1 and the filter F2 are set, the sensitivity of the image sensor with respect to the central wavelength in the transmission wavelength range of the filter F2 is higher than the sensitivity with respect to the central wavelength in the transmission wavelength range of the filter F1.

If the filter array FA includes a plurality of filters having different central wavelengths in the transmission wavelength range, the advantageous effects of the present exemplary embodiment can be obtained by satisfying the above-described conditional expressions for only some of the filters. However, in order to obtain the advantageous effects regardless of the combination or arrangement of the filters, it is desirable to satisfy the conditional expressions described above for all filters.

As described above, the interference band-pass filter has an angle dependence larger than that of the absorption band-pass filter, and stray light caused by reflection is more likely to be generated in the interference band-pass filter than in the absorption band-pass filter. Accordingly, when the filter array FA includes an interference band-pass filter, it is desirable to satisfy the above described conditional expressions for the interference band-pass filter. In other words, as illustrated in FIG. 2, more advantageous effects can be obtained when the filter array FA is arranged on the object side relative to the lens array LA.

While the present exemplary embodiment illustrates a case where the optical surface CLR2 is arranged at a position closest to the filter array FA (in the optical system CL) on the object side relative to the filter array FA, the present invention is not limited to this configuration. For example, an optical element such as a cover glass (plate glass) may be arranged, as needed, between the optical surface CLR2 and the filter array FA. However, to obtain more advantageous effects of the present exemplary embodiment, the optical surface CLR2 is desirably an optical surface arranged at a position closest to the filter array FA among the optical surfaces having power and arranged on the object side relative to the filter array FA (first optical portion).

The exemplary embodiment described above illustrates a case where the light beam from an object is incident on the filter F1 from the opposite side of the main optical axis AX0 with respect to the filter F1. This also applies to a case where the light beam from the object is incident on the filter F2 from the same side of the main optical axis AX0 with respect to the filter F2. This will be described in detail below.

Figure 7:
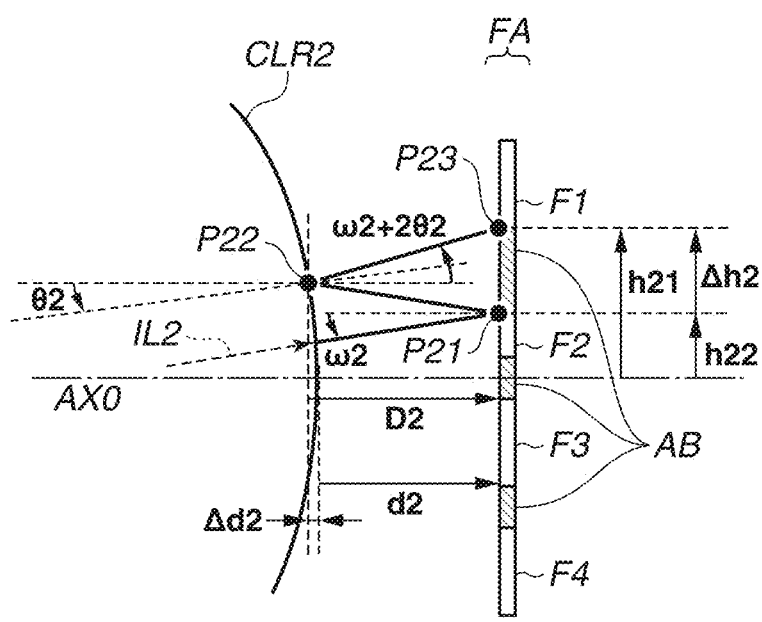
FIG. 7 is a fourth schematic diagram illustrating an optical system according to the exemplary embodiment.

FIG. 7 is an enlarged schematic diagram illustrating a part of the optical surface CLR2 and the filter array FA, like FIG. 3. Unlike FIG. 3, FIG. 7 illustrates an optical path of a light beam IL2 incident on a point P21 (third point) of the filter F2 from the same side (lower side) as the main optical axis AX0 among the light beams from the object side.

A light beam in a transmission wavelength range outside the transmission wavelength range of the filter F2 in the light beam IL2 incident on the point P21 is reflected at the point P21 and incident on a point P22 (fourth point) of the optical surface CLR2. If an angle (incident angle of the light beam IL2 with respect to the filter F2) formed between the main optical axis AX0 and the light beam IL2 incident on the point P21 is represented by ω2 [deg], a reflection angle of the light beam IL2 with respect to the filter F2 in accordance with the law of reflection is also represented by ω2 [deg]. A part of the light beam IL2 incident on the point P22 is reflected and enters a point P23 in the filter array FA.

If an angle (normal line angle at the point P22) formed between the main optical axis AX0 and a normal line to the optical surface CLR2 at the point P22 is represented by θ2 [deg], an angle formed between the main optical axis AX0 and the light beam IL2 reflected at the point P22 in accordance with the law of reflection is represented by ω2+2×θ2. Here, a distance in the optical axis direction from the filter F2 to the point P22 is represented by D2 [mm], a distance to the main optical axis AX0 from an edge of the filter F1 facing the filter F2 is represented by h21 [mm], and a distance from the point P21 to the main optical axis AX0 is represented by h22 [mm]. In this case, in order to prevent the stray light from the filter F2 from entering another filter, the following conditional expression (B1) may be satisfied.

$$h22+D2\times\{\tan \omega2+\tan(\omega2+2\times\theta2)\}<h21 \quad (B1)$$

The left-hand side of the conditional expression (B1) represents the height of the point P23 with respect to the main optical axis AX0. When the conditional expression (B1) is transformed, the following conditional expression (B2) can be obtained.

$$D2\times\{\tan \omega2+\tan(\omega2+2\times\theta2)\}<h21-h22 \quad (B2)$$

When Δh2=h21−h22 holds and the conditional expression (B2) is solved in terms of the normal line angle θ2, the following conditional expression (4) is derived.

[Expression 7]

$$\theta2 < \frac{1}{2}\times\arctan\left\{-\frac{2\times\tan\omega2-\frac{\Delta h2}{D2}}{1-\tan\omega2\times\left(\tan\omega2-\frac{\Delta h2}{D2}\right)}\right\} \quad (4)$$

Accordingly, it is desirable to set the normal line angle θ2 at the point P22 of the optical surface CLR2 to satisfy the conditional expression (4). A desirable position of the point P21, a desirable effective diameter of each filter, and the like are similar to those described above with reference to FIGS. 4A to 6. The advantageous effects of the present exemplary embodiment can be obtained by satisfying at least one of the conditional expressions (1) and (4) described above. However, it is preferable to satisfy both the conditional expressions (1) and (4). When only the conditional expression (1)

is focused, $\omega 1$, $\theta 1$, $D1$, $h11$, $h12$, and $\Delta h1$ may be replaced with $\omega$, $\theta$, $D$, $h1$, $h2$, and $\Delta h$, respectively. When only the conditional expression (4) is focused, assuming that the point P21 is set as a first point and the point P22 is set as a second point, $\omega 2$, $\theta 2$, $D2$, $h21$, $h22$, and $\Delta h2$ may be replaced with $\omega$, $\theta$, $D$, $h1$, $h2$, and $\Delta h$, respectively.

As illustrated in FIG. 7, when concentrating on the stray light reflected by one of two adjacent filters (filter F2) that is closer to the main optical axis AX0 than the other one of the two filters, it is desirable to set the optical surface CLR2 at a location as closest to the filter array FA as possible. With this configuration, the stray light that is reflected by the filter closer to the main optical axis AX0 (center of the filter array FA) is reflected more often than the stray light that is reflected by the filter that is farther from the main optical axis AX0. As the number of reflections of the stray light between the optical surface CLR2 and the filter array FA increases, the number of reflections exceeds the maximum number of reflections described above and the intensity of the stray light is sufficiently lowered, or substantially all the stray lights are shielded by the light-shielding wall AB.

Specifically, in a case where the distance from the optical surface CLR2 to the filter array FA on the main optical axis AX0 is represented by d2 [mm], it is desirable to satisfy the following conditional expression (5). If the optical surface CLR2 is a spherical surface, the distances d1 and d2 described above match.

$$1.00 \times 10^{-3} < d2/h21 < 2.00 \quad (5)$$

If the upper limit of the conditional expression (5) is exceeded, the optical surface CLR2 is extremely far from the filter array FA, and the stray light reflected by the (inside) filter closer to the main optical axis AX0 is more likely to enter the (outside) filter farther from the main optical axis AX0. In addition, the length of the entire system with respect to the effective diameter of the optical surface CLR2 increases, which makes it difficult to downsize the entire apparatus. In a case where the value falls below the lower limit of the conditional expression (5), the optical surface CLR2 is extremely close to the filter array FA, so that the members may interfere with each other. In particular, in a case where the filter array FA is replaceable, the members are more likely to contact each other when inserting or removing the filter array FA.

Further, it is preferable to satisfy the following conditional expression (5a) to (5d) in this order.

$$1.00 \times 10^{-3} < d2/h21 < 1.73 \quad (5a)$$

$$5.00 \times 10^{-3} < d2/h21 < 1.70 \quad (5b)$$

$$1.00 \times 10^{-2} < d2/h21 < 1.68 \quad (5c)$$

$$0.15 < d2/h21 < 1.00 \quad (5d)$$

Figure 8:
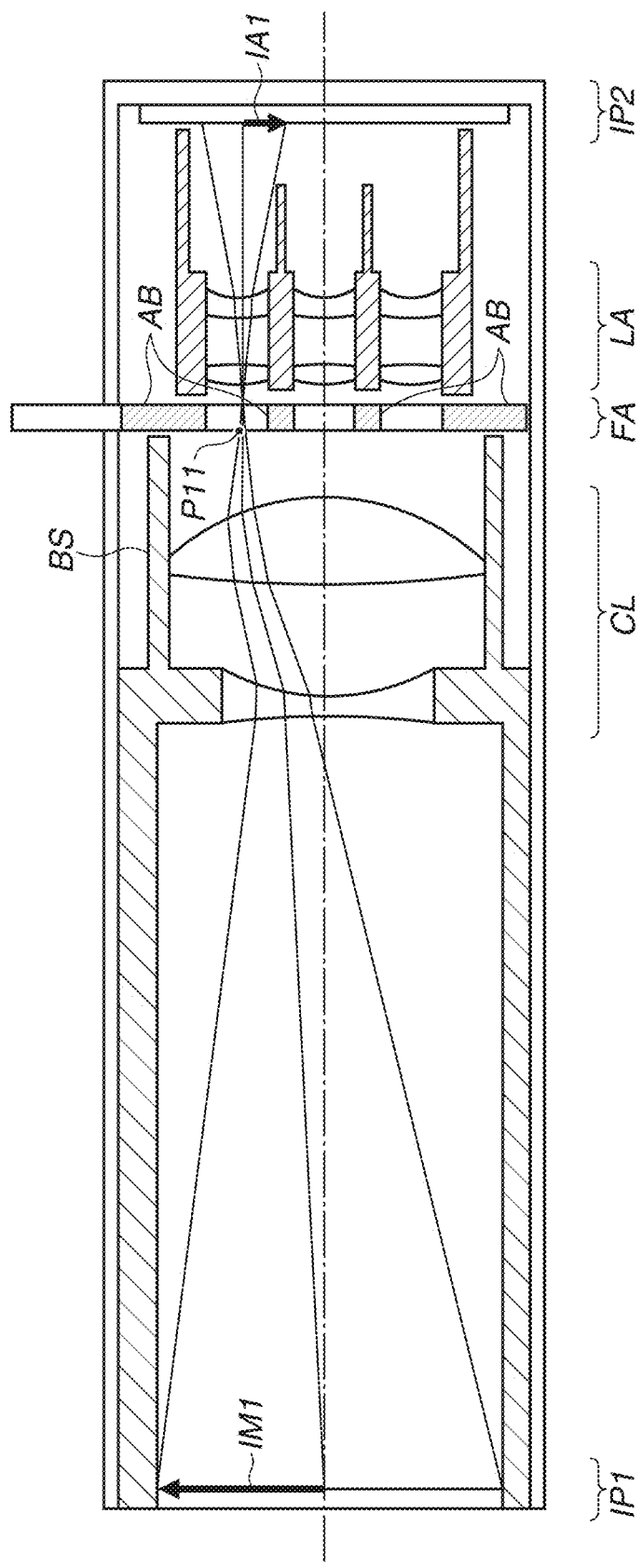
FIG. 8 is a schematic diagram illustrating a major part of an optical system according to First Example.
Figure 9:
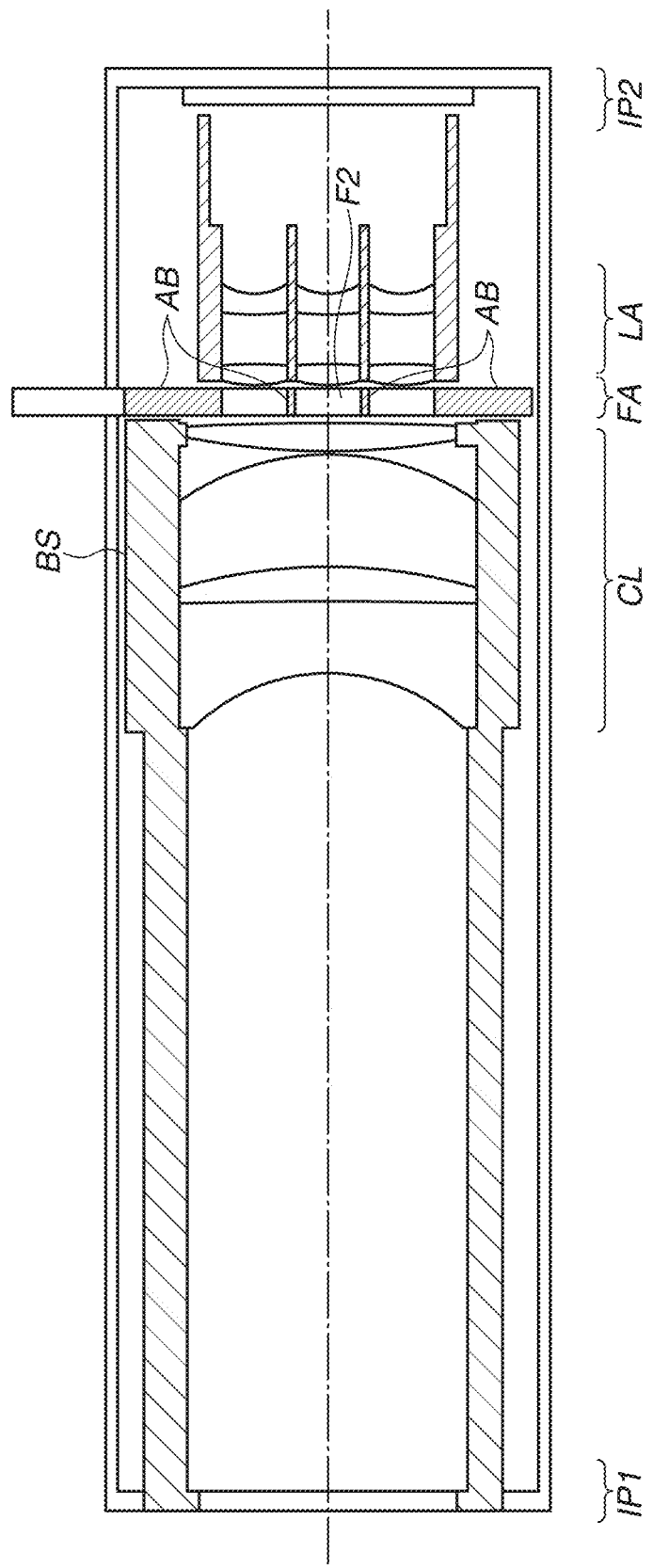
FIG. 9 is a schematic diagram illustrating a major part of an optical system according to Second Example.
Figure 10:
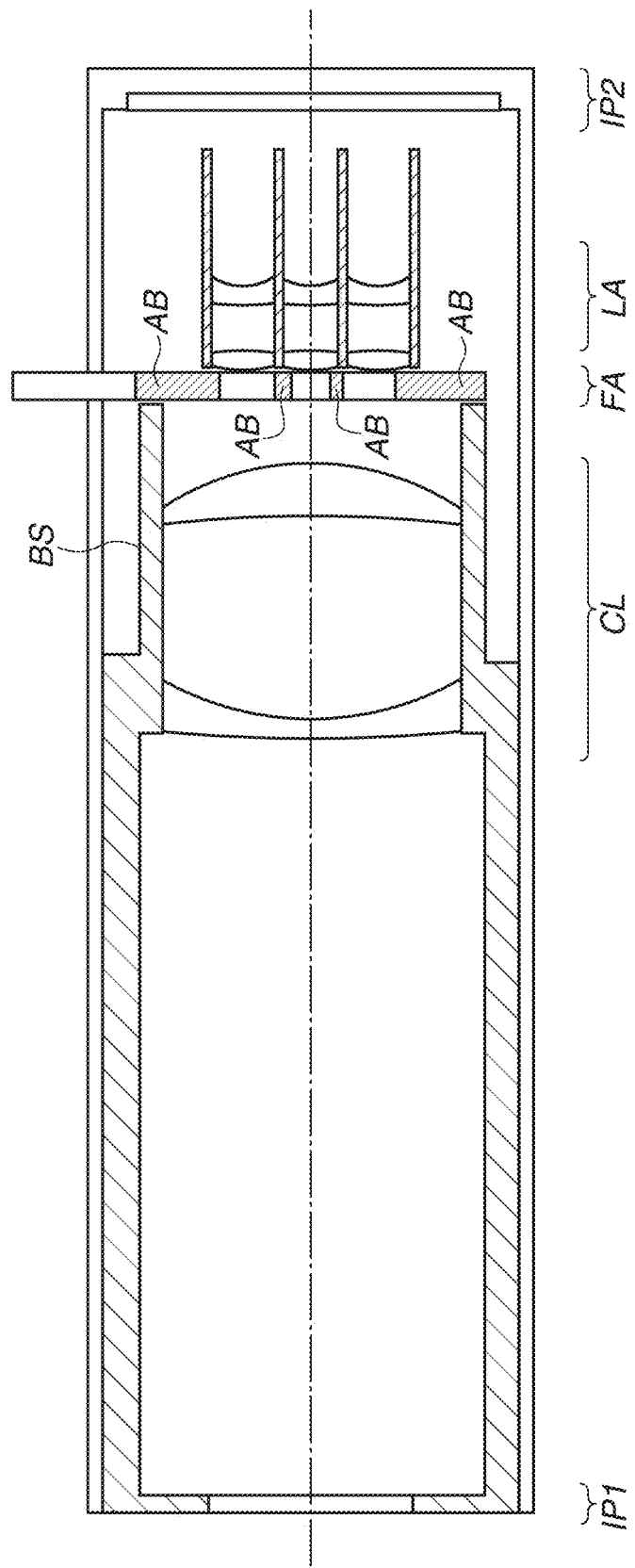
FIG. 10 is a schematic diagram illustrating major part of an optical system according to Third Example.

An image capturing system according to examples will be described below. Descriptions of components similar to those in the exemplary embodiments described above are omitted. FIGS. 8 to 10 are schematic diagrams illustrating a major part of a section including the main optical axis of each of image capturing systems according to First Example to Third Example. FIGS. 8 to 10 each illustrate a configuration in which the optical system CL, the lens array LA, and the image sensor described above are held by the same holding member and the filter array FA is detachably attached to the holding member. However, as described above, the members may be detachably attached to each other, or may be integrally held.

In each example, the optical system CL has different configurations and arrangements. However, the filter array FA and the lens array LA have the same configuration. The optical system CL according to the First Example consists of a biconcave lens and a biconvex lens which are arranged in order from the object side. The optical system CL according to the Second Example consists of a negative meniscus lens having a convex surface facing the image side, a positive meniscus lens having a convex surface facing the image side, and a biconvex lens, which are arranged in order from the object side. The optical system CL according to the Third Example consists of a negative meniscus lens having a convex surface facing the object side and a positive meniscus lens having a convex surface facing the image side, which are arranged in order from the object side. It is possible to correct chromatic aberrations more favorably by providing the optical system CL with the positive lens and the negative lens.

In the Third Example, optical surfaces of the lens (final lens), which is located at a position closest to the image plane in the optical system CL, at the object side and the image side have a convex shape toward the image side. In other words, each of the optical surfaces can be regarded as a reflection surface having a negative power with respect to stray light reflected by the filter array FA. According to this configuration, the stray light can be diffused on each optical surface of the final lens in the optical system CL, thereby making it possible to decrease the intensity of the stray light that enters the filter array FA again.

First Numerical Example to Third Numerical Example corresponding to the above-described First Example to Third Example, respectively, will be described below. In each numerical example, a surface number represents the order of each optical surface when counted from the intermediate image IM1. r [mm] represents the curvature radius of an i-th optical surface, and d [mm] represents a distance between the i-th optical surface and an (i+1)th optical surface. Further, nd and vd represent a refractive index and an Abbe number, respectively, of a medium (material) between the i-th optical surface and the (i+1)th optical surface with respect to light (d-line) having a wavelength of 587.6 nm. In each numerical example, only data on the optical system CL is illustrated, and data from the filter array FA to the image plane IP2 is omitted.

First Numerical Example

Unit mm
Surface data

| Surface number | r | d | nd | vd |
|---|---|---|---|---|
| 0 (IM1) | ∞ | 58.50 | | |
| 1 | −75.496 | 1.50 | 1.74000 | 28.3 |
| 2 | 18.691 | 8.41 | | |
| 3 | 99.592 | 6.59 | 1.58913 | 61.1 |
| 4 | −18.579 | 5.00 | | |
| 5 (FA) | ∞ | | | |

Second Numerical Example

Unit mm
Surface data

| Surface number | r | d | nd | vd |
|---|---|---|---|---|
| 0 (IM1) | ∞ | 58.50 | | |
| 1 | −13.802 | 5.12 | 1.70585 | 30.2 |
| 2 | −358.240 | 2.47 | | |
| 3 | −37.751 | 8.00 | 1.64100 | 56.9 |
| 4 | −18.529 | 0.25 | | |
| 5 | 52.898 | 2.00 | 1.62041 | 60.3 |
| 6 | −205.000 | 0.50 | | |
| 5 (FA) | ∞ | | | |

Third Numerical Example

Unit mm
Surface data

| Surface number | r | d | nd | vd |
|---|---|---|---|---|
| 0 (IM1) | ∞ | 58.50 | | |
| 1 | 123.334 | 1.50 | 1.75520 | 27.5 |
| 2 | 23.018 | 15.72 | | |
| 3 | −100.000 | 4.08 | 1.62041 | 60.3 |
| 4 | −20.865 | 5.00 | | |
| 5 (FA) | ∞ | | | |

Table 1 illustrates numerical values associated with each conditional expression in each example (each numerical example). Table 1 illustrates a case where $\omega 1 = \omega 2$ holds, the point P11 is located at an edge (lower end) of the filter F1 closer to the filter F2 (h11=h21), and the point P21 is located at an edge (upper end) of the filter F2 closer to the filter F1 (h12=h22). As described above, in this case, the conditional expressions (1) and (4) can be satisfied regardless of the positions of the point P11 and the point P21 by satisfying the conditional expressions (1) and (4).

As illustrated in Table 1, at least one of the conditional expressions (1) and (4) is satisfied in each of the examples. In the First Example and Third Example, all conditional expressions other than the conditional expressions (1) and (4) are satisfied. In the Second Example, the conditional expressions (A4) and (2) are not satisfied, but the occurrence of a ghost can be favorably suppressed by satisfying the other conditional expressions.

TABLE 1

| | | First Example | Second Example | Third Example |
|---|---|---|---|---|
| ω1, ω2 [deg] | | 7 | 5 | 3 |
| h11, h12 [mm] | | 6.80 | 2.70 | 3.00 |
| h12, h22 [mm] | | 4.50 | 2.57 | 1.50 |
| D1 [mm] | | 6.02 | 0.52 | 5.18 |
| D2 [mm] | | 5.74 | 0.52 | 5.07 |
| d1, d2 [mm] | | 5.00 | 0.50 | 5.00 |
| R [mm] | | 18.6 | 205.0 | 20.9 |
| θ1 [deg] | | 19.0 | 0.7 | 7.5 |
| θ2 [deg] | | 16.3 | 0.7 | 4.9 |
| Conditional expression (1) | Lower limit | −3.8 | −2.2 | −5.2 |
| Conditional expression (A4) | h11/tanω1−d1 | 50.4 | 30.4 | 52.2 |
| Conditional | R/h11 | 2.7 | 75.9 | 7.0 |
| expression (2) | 1/tanω1−d1/h11 | 7.4 | 11.2 | 17.4 |
| Conditional expression (4) | Upper limit | 4.3 | 2.2 | 5.3 |
| Conditional expression (5) | d2/h21 | 0.74 | 0.19 | 1.67 |

Preferred exemplary embodiments and examples of the present invention have been described above. However, the present invention is not limited to the exemplary embodiments and examples described above, and can be combined, modified, and changed in various ways within the scope of the invention.

While the exemplary embodiments described above illustrate a case where the lens portion also functions as an aperture, that is, the effective diameter of the lens portion is determined by the lens portion itself, the aperture may be provided as a separate member. In one image forming portion, in a case where the lens portion includes a plurality of lenses, or in a case where the filter includes a plurality of filter elements, the lenses and the filter elements may be alternately arranged in the optical axis direction.

Further, an image forming portion including a plurality of filters arranged so as to divide the pupil of the lens portion on the X-Y plane. In this case, the provision of a fine lens array on an area corresponding to the image forming portion on the imaging plane makes it possible to use the image capturing system as a plenoptic camera. According to this configuration, light passing through the pupil of one lens portion is divided and incident on different pixels on the imaging plane, thereby enabling acquisition of more pieces of image information. A configuration in which the optical system CL includes a mirror (reflection element) may be employed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-204486, filed Oct. 30, 2018, which is hereby incorporated by reference herein in its entirety.

What is claimed is:

1. An optical system arranged on an object side relative to a first optical portion, the first optical portion including a plurality of lens portions each configured to form an image of an object, and a plurality of filters corresponding to the plurality of lens portions, the optical system comprising:
   a second optical portion including an optical surface common to the plurality of lens portions,
   wherein the following conditional expression is satisfied:

$$\frac{1}{2} \times \arctan\left\{\frac{2 \times \tan\omega 1 - \frac{\Delta h1}{D1}}{1 - \tan\omega 1 \times \left(\tan\omega 1 - \frac{\Delta h1}{D1}\right)}\right\} < \theta 1,$$

where ω1 is an angle between an optical axis of the second optical portion and a light beam from the object, the light beam being incident from an opposite side of the optical axis on a first point in a first filter among the plurality of filters; θ1 is an angle formed between the optical axis and a normal line to the optical surface at a second point where the light beam reflected at the first point is incident; D1 is a distance in an optical axis direction from the first filter to the second point; h11 is a distance from the first point to the optical axis; h12 is a distance from an edge of a second filter facing the first filter to the optical axis, the second filter being adjacent to a side of the first filter closer to the optical axis; and Δh1=h11−h12.

2. The optical system according to claim 1, further comprising a first light-shielding member arranged between the first filter and the second filter within the same plane as the first filter and the second filter and configured to shield the light beam reflected at the second point.

3. The optical system according to claim 1, further comprising a second light-shielding member arranged at a position farther from the optical axis than the plurality of filters is and configured to shield the light beam reflected at the second point.

4. The optical system according to claim 1, wherein in a direction vertical to the optical axis, an incident point of the light beam from the object farthest from the optical axis in the first filter is positioned within a range from a center of the first filter to an edge of the first filter closer to the optical axis.

5. The optical system according to claim 1, wherein the following conditional expression is satisfied:

$R < h11/\tan\omega1 - d1$, where R is a curvature radius of the optical surface at the second point; and d1 is a distance to the first filter from a virtual spherical surface of a curvature radius R including the second point.

6. The optical system according to claim 1, wherein the light beam incident on the first point is an outermost off-axis ray.

7. The optical system according to claim 1, wherein an effective diameter of the second filter is smaller than an effective diameter of the first filter.

8. The optical system according to claim 1, wherein a central wavelength in a transmission wavelength range of the first filter is longer than a central wavelength in a transmission wavelength range of the second filter.

9. The optical system according to claim 1, wherein the first filter is arranged at a position farthest from the optical axis among the plurality of filters.

10. The optical system according to claim 1, wherein the optical surface is an optical surface arranged at a position closest to the plurality of filters among optical surfaces having power and arranged on the object side relative to the plurality of filters.

11. The optical system according to claim 1, wherein the optical surface includes an antireflection structure.

12. The optical system according to claim 1, wherein the following conditional expression is satisfied:

$$\theta2 < \frac{1}{2} \times \arctan\left\{-\frac{2 \times \tan\omega2 - \frac{\Delta h2}{D2}}{1 - \tan\omega2 \times \left(\tan\omega2 - \frac{\Delta h2}{D2}\right)}\right\},$$

where ω2 is an angle formed between the optical axis and a light beam from the object, the light beam being incident on a third point in the second filter from the same side as the optical axis; θ2 is an angle formed between the optical axis and a normal line to the optical surface at a fourth point where the light beam reflected at the third point is incident; D2 is a distance in the optical axis direction from the second filter to the fourth point; h21 is a distance from an edge of the first filter facing the second filter to the optical axis; h22 is a distance from the third point to the optical axis; and Δh2=h21−h22.

13. The optical system according to claim 12, wherein the following conditional expression is satisfied:

$1.0 \times 10^{-3} < d2/h21 < 2.0$, where d2 is a distance from the optical surface on the optical axis to the second filter.

14. The optical system according to claim 1, wherein an optical surface adjacent to an object side of the optical surface has a convex shape toward an image side.

15. The optical system according to claim 1, wherein the second optical portion converts light from the object into parallel light.

16. An optical system arranged on an object side relative to a first optical portion is, the first optical portion including a plurality of lens portions each configured to form an image of an object, and a plurality of filters corresponding to the plurality of lens portions, the optical system comprising:
a second optical portion including an optical surface common to the plurality of lens portions,
wherein the following conditional expression is satisfied:

$$\theta < \frac{1}{2} \times \arctan\left\{-\frac{2 \times \tan\omega - \frac{\Delta h}{D}}{1 - \tan\omega \times \left(\tan\omega - \frac{\Delta h}{D}\right)}\right\},$$

where ω is an angle formed between the optical axis and a light beam from the object, the light beam being incident from the same side as the optical axis on a first point in a first filter among the plurality of filters; θ is an angle formed between the optical axis and a normal line to the optical surface at a second point where the light beam reflected at the first point is incident; D is a distance in an optical axis direction from the first filter to the second point; h1 is a distance from an edge of a second filter facing the first filter to the optical axis, the second filter being adjacent to an opposite side of the optical axis of the first filter; h2 is a distance from the first point to the optical axis; and Δh=h1−h2.

17. An accessory apparatus comprising the optical system according to claim 1, wherein the accessory apparatus is detachably attachable to an imaging apparatus.

18. An imaging apparatus comprising:
an optical system according to claim 1; and
an image sensor configured to receive light from the optical system.

19. The imaging apparatus according to claim 18, wherein the image sensor is common to the plurality of lens portions.

20. The imaging apparatus according to claim 18, wherein a sensitivity of the image sensor with respect to a central wavelength in a transmission wavelength range of the second filter is higher than a sensitivity with respect to a central wavelength in a transmission wavelength range of the first filter.

* * * * *